United States Patent
Bryngelson et al.

(10) Patent No.: US 6,719,258 B2
(45) Date of Patent: Apr. 13, 2004

(54) SHOCK AND VIBRATION ISOLATION APPARATUS FOR MOTOR VEHICLES SEATS

(75) Inventors: Duane R. Bryngelson, Circle Pines, MN (US); Philip T. Fortin, Plymouth, MN (US)

(73) Assignee: Activar, Inc., Bloomington, MN (US)

( * ) Notice: Subject to any disclaimer, the term of this patent is extended or adjusted under 35 U.S.C. 154(b) by 0 days.

(21) Appl. No.: 10/244,908

(22) Filed: Sep. 16, 2002

(65) Prior Publication Data

US 2004/0051023 A1 Mar. 18, 2004

(51) Int. Cl.[7] ............................................. F16M 13/00
(52) U.S. Cl. ...................... 248/419; 248/618; 248/630; 248/636
(58) Field of Search ................... 248/630, 631, 248/618, 636, 419, 420

(56) References Cited

U.S. PATENT DOCUMENTS

| | | |
|---|---|---|
| 2,715,938 A | 8/1955 | Miller |
| RE24,217 E | 9/1956 | Miller |
| 2,932,342 A | 4/1960 | Simons |
| 3,061,260 A | 10/1962 | Simons |
| 3,100,617 A | 8/1963 | Radke |
| 3,100,618 A | 8/1963 | Tengler |
| 3,594,040 A | 7/1971 | Monroe |
| 3,826,457 A * | 7/1974 | Huot de Longchamp ... 248/564 |
| 3,853,296 A | 12/1974 | Forssell |
| 3,999,800 A | 12/1976 | Penzotti |
| 4,295,627 A | 10/1981 | Graves |
| 4,382,573 A | 5/1983 | Aondetto |
| 4,408,774 A | 10/1983 | Raskob |
| 4,461,444 A * | 7/1984 | Grassl et al. ............... 248/550 |
| 4,475,707 A | 10/1984 | Foster |
| 4,601,455 A | 7/1986 | Lowe et al. |
| 4,645,169 A * | 2/1987 | Mischer ...................... 248/550 |
| 4,778,216 A * | 10/1988 | Stupakis ...................... 297/17 |
| 5,154,402 A | 10/1992 | Hill et al. |
| 5,251,864 A * | 10/1993 | Itou ............................ 248/588 |
| 5,299,906 A * | 4/1994 | Stone .......................... 187/275 |
| 5,324,203 A * | 6/1994 | Sano et al. ................... 439/34 |
| RE35,572 E | 7/1997 | Lloyd |
| 5,765,802 A | 6/1998 | Bostrom et al. |

(List continued on next page.)

FOREIGN PATENT DOCUMENTS

| | | |
|---|---|---|
| JP | 1-208243 | 8/1989 |
| JP | 6-270725 | 9/1994 |

*Primary Examiner*—Leslie A. Braun
*Assistant Examiner*—Amy J. Sterling
(74) *Attorney, Agent, or Firm*—Thomas J. Nikolai; Nikolai & Mersereau, P.A.

(57) ABSTRACT

A seat assembly for a motor vehicle includes an air spring suspension system for effectively isolating the occupant of the vehicle's seat from shock, vibration and inertial forces directed along both a vertical axis and a horizontal axis. A stationary base plate member is attached to the floor of the vehicle and it supports a pivot linkage assembly joining the stationary base member to a movable base member. An air spring is disposed between the stationary base member and the movable base member to displace the movable base member in a generally vertical direction to an extent allowed by the linkage assembly. Supported atop the movable base member is a seat slide assembly that permits fore and aft adjustment of seat position within the vehicle. A vehicle seat mount is affixed to the pair of slide members and includes shock absorbing springs that are disposed between the slide members and the vehicle seat mount for cushioning inertial forces due to acceleration and braking. Associated with the air bag is a control switch that operates to selectively inflate and deflate the air bag to offset vertically directed inertial forces acting on the seat assembly.

5 Claims, 6 Drawing Sheets

U.S. PATENT DOCUMENTS

| | | | |
|---|---|---|---|
| 5,771,816 A | * | 6/1998 | Zaguroli, Jr. ............... 108/147 |
| 5,950,977 A | * | 9/1999 | Proksch et al. ............. 248/421 |
| 6,120,082 A | | 9/2000 | Vandermolen |
| 6,135,412 A | * | 10/2000 | Buehler ..................... 248/421 |
| 6,202,972 B1 | * | 3/2001 | Manavi ..................... 248/421 |
| 6,237,889 B1 | | 5/2001 | Bischoff |
| 6,241,209 B1 | | 6/2001 | von Mayenburg et al. |
| 6,286,812 B1 | * | 9/2001 | Cherry ....................... 254/9 C |
| 6,286,819 B1 | | 9/2001 | Ritchie et al. |
| 6,371,456 B1 | | 4/2002 | Ritchie et al. |

\* cited by examiner

SHOCK AND VIBRATION ISOLATION APPARATUS FOR MOTOR VEHICLES SEATS

BACKGROUND OF THE INVENTION

I. Field of the Invention

This invention relates generally to vehicle seats, and more particularly to vehicle seats which are effectively isolated from the effects of road shock and forces due to sudden acceleration and deceleration of the vehicle.

II. Discussion of the Prior Art

It is well known that semi-tractor trucks and other truck-type commercial vehicles tend to have a relatively stiff suspension system whereby shock and vibration forces occasioned from traversing road bumps and the like are effectively transmitted to the driver or passenger to be lurched forward or rearward depending upon the magnitude of the deceleration and acceleration vectors.

To improve the comfort of the ride, it is desirable, as much as possible, to isolate the seat occupant from these types of inertial forces. There are disclosed in the prior art various systems for isolating a vehicle driver or passenger from bouncing or jolting in the vertical direction, but compensation for fore and aft translation due to acceleration and deceleration have largely not been addressed. For example, in the Thompson et al. U.S. Pat. No. 3,990,668, a vehicle seat is described which incorporates a hydraulic actuator coupled in circuit with a valve whose spool is directly connected by linkages to the seat. The valve is operative to change the response of an accumulator coupled to the actuator so as to cushion the ride and to accommodate large excursions from a predetermined ride position due to major shocks. The Thompson et al. reference has no provision for cushioning or dampening fore and aft movement of the seat system.

Other prior art patents incorporate pneumatic cylinders or air bags operate strictly to adjust the height of the seat above the floor so as to accommodate drivers/passenger of differing physical stature. In this regard, reference is made to the Costin U.S. Pat. No. 3,954,245 and the Misher et al. U.S. Pat. No. 4,638,982. Neither of these patents teaches a seat construction for minimizing or nulling out fore and aft sway of the seat under breaking and accelerating conditions, respectively.

In U.S. Pat. No. Re. 35,572, which is assigned to the assignee of the present application, a seat construction is disclosed which minimizes the fore and aft sway of the seat. The device shown in that patent uses both horizontally and vertically disposed air bags operating in cooperation with springs to dampen motion. Also utilized is a plurality of vertical hydraulic vibration dampeners. While the system described in the '572 patent has proven to be commercially successful, it has a comparatively high cost of manufacture which impacts the profit margins achievable.

The present invention is advantageous over U.S. Pat. No. Re. 35,572 due to new concepts included in its simplified and scaled-back design. Some differences include a single air bag for dampening in the vertical direction without multiple hydraulic vibration dampeners and the use of a spring and slide rod arrangement for horizontal dampening dispensing with the need for a horizontally disposed air bag. This design enables effective isolation of forces exerted in both the vertical and horizontal direction at a substantially reduced cost. Moreover, because the stabilizing linkages and hydraulic dampener employed between the units stationary base and movable base can pivot, a greater range of vertical displacement of the seat can be achieved.

SUMMARY OF THE INVENTION

The present invention provides for a seat assembly which is adapted to be attached to the floor of a motor vehicle, such as a semi-tractor. The assembly includes a stationary base or mounting plate which is attached to the vehicle's floor board and forms the bottom of a box-like housing. A movable base member is pivotally joined to the stationary base member by linkages. Mounted on a pedestal within the box-like housing is a means for displacing the movable base member along a path determined by the linkages. This means may comprise a vertically oriented air spring support frame which is slide mounted and free to move back and forth in the fore and aft direction when manually unlatched by the seat's occupant, whereby the seat position can be set to accommodate the person's stature. The upholstered seat is secured to that latter slide assembly. To dampen out any tendency of the seat to oscillate due to uneven road surfaces, a hydraulic cylinder is operatively coupled between the stationary base member and the movable base member.

A control means for adjusting the relative height of the vertically displaceable seat-supporting frame is coupled to the vertically disposed air spring. The control means allow for inflating or deflating of the air spring based upon the user's desired seat height.

Horizontally disposed springs disposed on roller-supported, guide-rods act to cushion horizontal motions of the seat due to acceleration, braking and other generally horizontally directed forces encountered in the over-the-road travel.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements for seat apparatus design to isolate shock and vibration in motor vehicle seats. The embodiments herein are intended to be taken as representative of those in which the invention may be incorporated and are not intended to be limiting.

Figure 1:
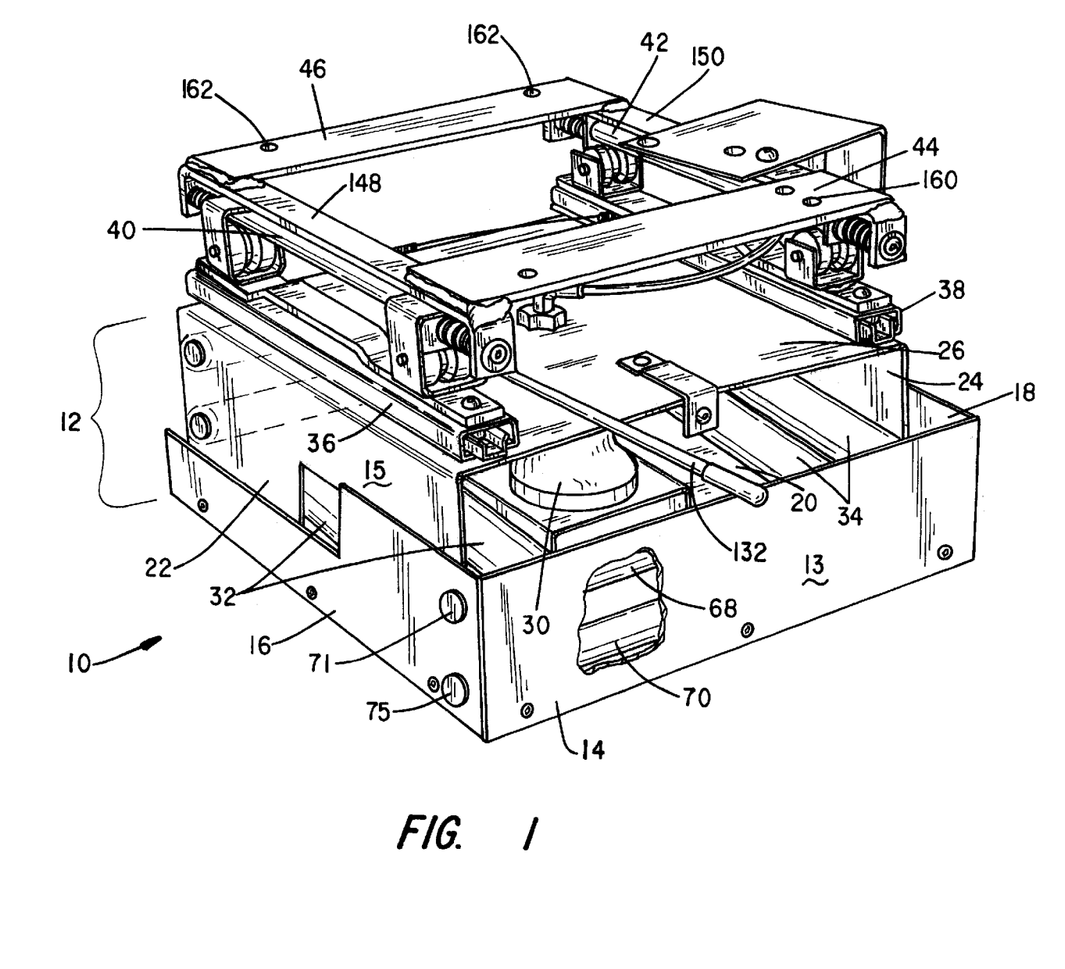
FIG. 1 is a perspective view of the seat assembly of the present invention.
Figure 3:
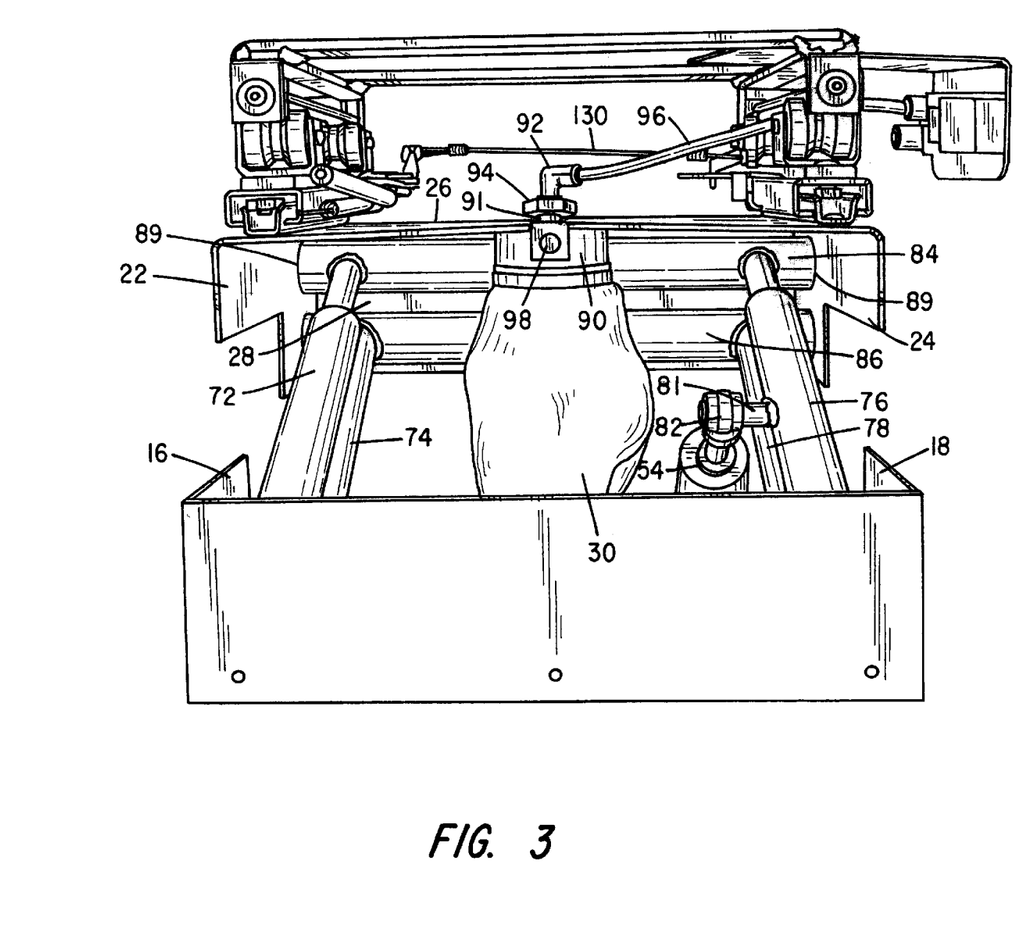
FIG. 3 is a front perspective view of the seat assembly in the raised position.

Referring first to FIG. 1, there is shown a perspective view of the seat support assembly, on which an upholstered seat and seat back, such as illustrated in the '572 patent (the teachings of which are hereby incorporated by reference), is mounted. The assembly itself is indicated generally by numeral 10 and includes a box-like housing 12 made up of a movable base member 15 and a stationary base member 13. The stationary base member 13 is comprised of front panel 14, lower right side panel 16, lower left side panel 18, and floor member 20. The movable base member is comprised of upper right side panel 22, upper left side panel 24, vertically displaceable top panel 26, and rear panel 28 (FIG. 3). Means are disposed between the stationary and movable base members for displacing the movable base members relative to the stationary member. More particularly, there is contained in the stationary housing, an air spring 30 and two pairs of parallel upper frame support linkages 32 and 34.

Also shown in FIG. 1 are slide rail assemblies 36 and 38 which enable movement in the fore and aft direction. Located above the slide rails are slide rods 40 and 42. Finally, front seat mount plate 44 and rear seat mount plate 46, to which the upholstered vehicle seat is adapted to be mounted, are indicated as well.

Figure 2:
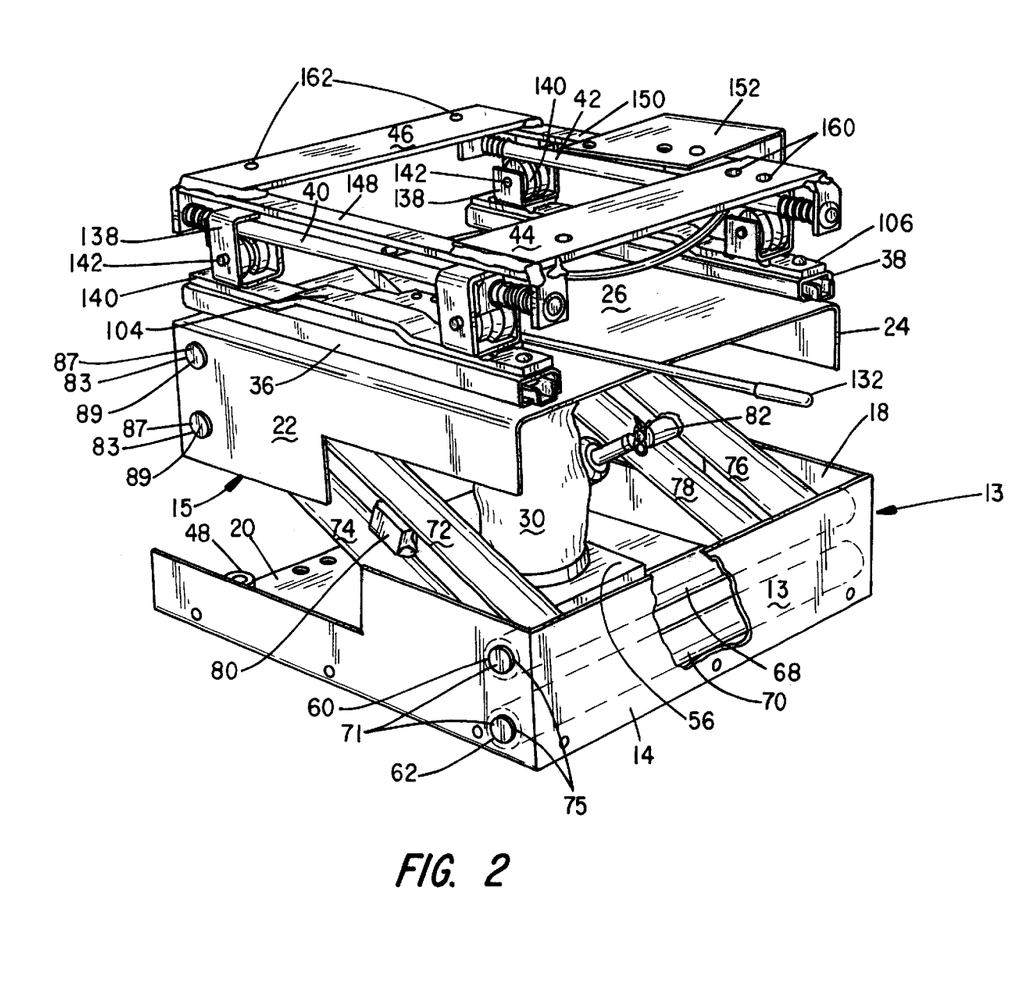
FIG. 2 is a perspective view of the seat assembly in the raised position.

With reference to FIG. 2, it can be seen that the seat assembly is in a raised position when compared to FIG. 1, allowing a more detailed examination of its features. Starting with housing 12, the floor member 20 is a flat panel adapted to be bolted to the floor of the vehicle. The exposed floor member surface has two raised cylindrical tubes of rubber 48 and 50 thereon near the back edge thereof as cushioning bumpers for the above features to rest against when the seat is in its lowermost position. The upper surface of floor member 20 also has a metal clevis 52 welded or otherwise affixed to it for mounting a cylinder 53 of a hydraulic dampener 54. The floor member also supports a rectangular pedestal 56, approximate its center, upon which air spring 30 sits. For another view of these elements also see FIG. 4.

Front panel 14, lower right side panel 16, and lower left side panel 18 each project vertically upward from floor member 20. Front panel 14 is a rectangular piece of sheet metal which extends across the front of the housing.

Side panels 16 and 18 are somewhat L-shaped flat panels aligned along the side edges of floor member 20. There are also two large, vertically aligned holes 60, 62 (FIG. 2) and 64, 66 (FIG. 5) on each of the side panels of the lower stationary housing 13 near the front ends of the opposed side panels. The center line of hole pairs 60 and 64 and of hole pair 62 and 66, are aligned with two parallel, cylindrical metal tubes 68 and 70, respectively, that form part of a linkage assembly for guiding movement of the movable base member when the air spring 30 is inflated and deflated. The tubes 68 and 70 are contained between the side panels, but are journaled on their ends using transversely extending pins 71 which pass through bushings (not shown) fitted into the holes. The pins are free to spin in the interior diameter of tubes 68 and 70. A C-shaped spring clip 75 fits in a groove on each end of the pins. The purpose of the clips is to prevent the pin 71 from moving longitudinally by creating a diameter too large to fit through the side panel holes, but still allowing the pin to freely rotate within its bushing and within the respective one of the tubes 68, 70 through which it passes.

Tubes 68 and 70 have welded near each of their ends, just inside the housing sidewalls, one of the four arms or stabilizing bars 72, 74, 76, or 78, which also form part of the linkage assembly. These stabilizing bars are oriented perpendicular to the tubes 68 and 70 to which they are fastened and are configured into two pairs of parallel tubular bars. Also, one pair of parallel arms or stabilizing bars has a stop 80 located between the bars.

Referring now to FIG. 3, a stub shaft 81, on the left side of the assembly, is attached to a piston rod end 82 of hydraulic dampener 54. This dampener aids the air spring 30 in the reduction of forces exerted upon a user in the vertical direction.

Also shown in FIG. 3 is how the arms or stabilizing bars 72, 74, 76, and 78 comprising the linkage assembly are welded to transversely extending tubes 84 and 86 which extend parallel to the back of the upper housing 15 in the same manner as the tubes 68 and 70 span the lower housing 13.

The upper housing member 15 contains a rear panel 28 which traverses across the back of the housing. It contains three small holes 88 for bolts used to attach it to a decorative cover (not shown). Also connected to the top plate of the upper housing are upper side panels 22 and 24. The side panels are somewhat L-shaped and roughly fit opposite the outline of the space defined by the lower side panels 16 and 18. The transverse width of the upper side panels is narrower than the width of the lower side panels. This difference in transverse width enables the upper side panels to nest inside the lower side panels when the assembly 10 is in its lowered position seen in FIG. 1. It is, of course, possible to make the size of the upper movable base member greater than that of the lower stationary base member so that the lower base member nests within the upper base member when in its lowered position.

In addition, there are four large holes 89 in the upper portion of the housing, one pair on each upper side panel, to which the axis of parallel cylindrical metal tubes 84 or 86 is aligned. In the same manner that cylindrical metal tubes 68 and 70 of the linkage assembly are journaled in the holes in the lower side panels 16 and 18, the cylindrical metal tubes 84 and 86 are journaled by pins 83 passing through the holes in the upper side panels 22 and 24 and through the tubes 84 and 86. On each end of the pins 83, which extend outside the side panels, is a conventional C-clip fastener 87. To prevent the pin 83 from moving longitudinally along its axis, the diameter of the C-clip is too large to fit through the side panel holes, but allows the pin to freely rotate within bushings disposed in the holes in the side panels.

The rear panel 28 and upper side panels 22 and 24 project vertically downward from vertically displaceable top panel 26 of the movable base member. Top panel 26 is a flat, rectangular piece of sheet metal which contains means to mount the upper cylindrical member 90, of air spring 30, to the center of its downward facing surface. At the center surface of the top panel 26 is a fitting hole 91 which connects to an angled tube fitting 92. This tube fitting 92 contains a hexagonal nut 94 for tightening to the hole and enables a connection to an air tube 96, providing pneumatic air pressure to the air spring 30. It is due to this air pressure, that air spring 30 is able to push up against the downward facing surface of top panel 26 and raise the level of the seat in a manner yet to be explained. The air spring can be inverted such that the fitting 92 is proximate the bottom of the lower stationary base member. In this way, the air fitting does not interfere with other structures.

The upward facing surface of top panel 26 contains an L-shaped clip 98 which is attached with a screw to the front of the top panel and is angled downward over the front edge of top panel 26 and contains another screw through the angled portion. The clip 98 is included to later facilitate hanging a skirt or decorative covering which hides the housing components from view.

Figure 4:
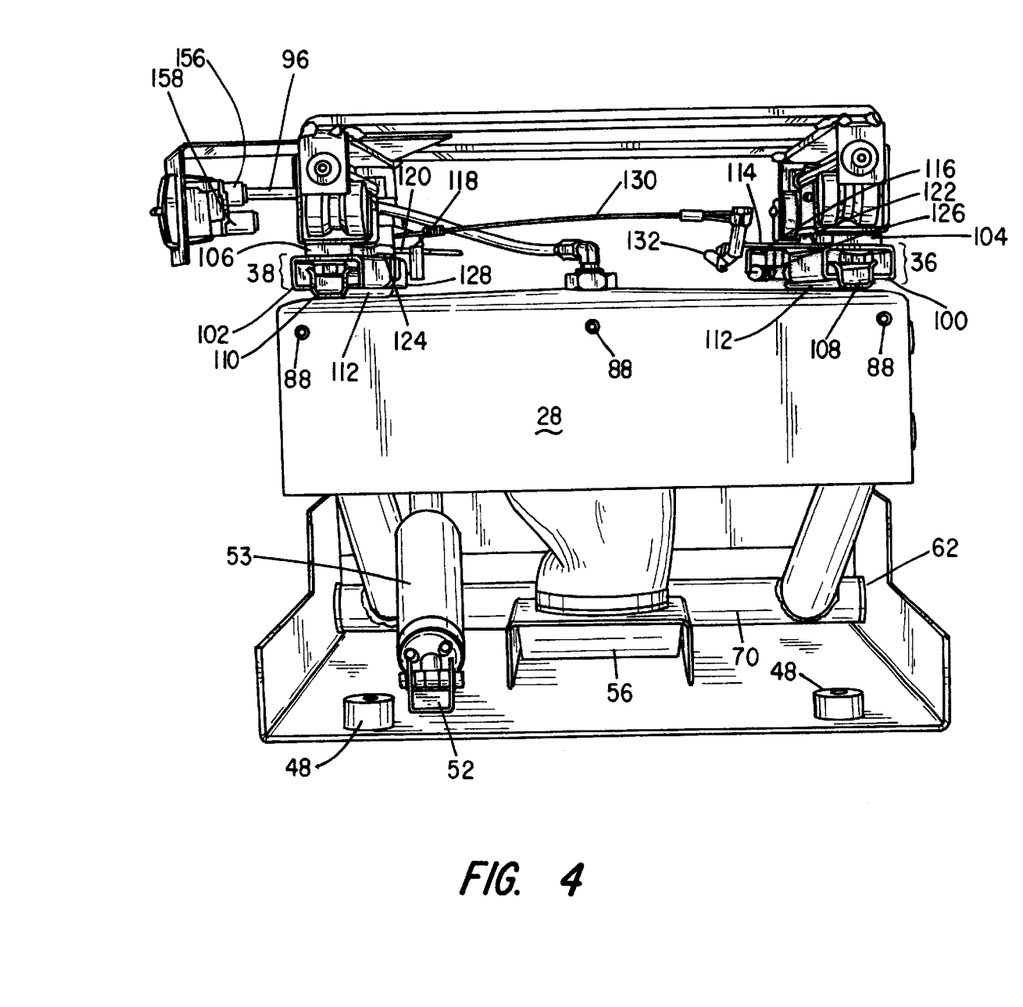
FIG. 4 is a rear perspective view of the seat assembly in the raised position.

As seen in FIG. 4, the top panel's upward facing surface also has slide rails 36 and 38 mounted along, and parallel to, its right and left sides. The slide rails 36 and 38, on the vertically moveable top plate 26, comprise a part of the seat mount assembly which is seen to include upper C-shaped channels 100 and 102 bolted to the flat spacer bars 104 and 106. The elongated C-shaped channels fit over the outwardly extending flanges of U-shaped channels 108 and 110 which are bolted to the upper surface of the vertically moveably top plate 26. Because of the manner in which the C-shaped channels 100 and 102 and U-shaped channels 108 and 110 interact, the two can slide back and forth relative to one another but cannot be separated.

The lower U-shaped channels 108 and 110 have a plurality of notches 112 formed at regularly spaced intervals along their lengths. A first latch plate 114 is pivotally joined by a rivet or pin 116 to the upper surface of the C-shaped channel 100. A second latch plate 118 is pivotally joined by a pin 120 to the upper surface of C-shaped channel 102 as well. These two latch plates each have a pair of fingers 122 and 124 positioned to penetrate through a pair of adjacent notches 112 when urged in position by springs 126 and 128. The latch plates are joined together by a latch cable 130. Lever 132 is joined to the first latch plate 114. Moving this lever would enable the fingers of the latch plates to disengage from their respective notches with the cooperation of latch cable 130, which joins the latch plate members. In general, the latching elements are very similar to those disclosed in U.S. Pat. No. Re. 35,572 by Lloyd et al. although the present invention has the addition of latching member components on both seat rail slides, not on just one.

Figure 5:
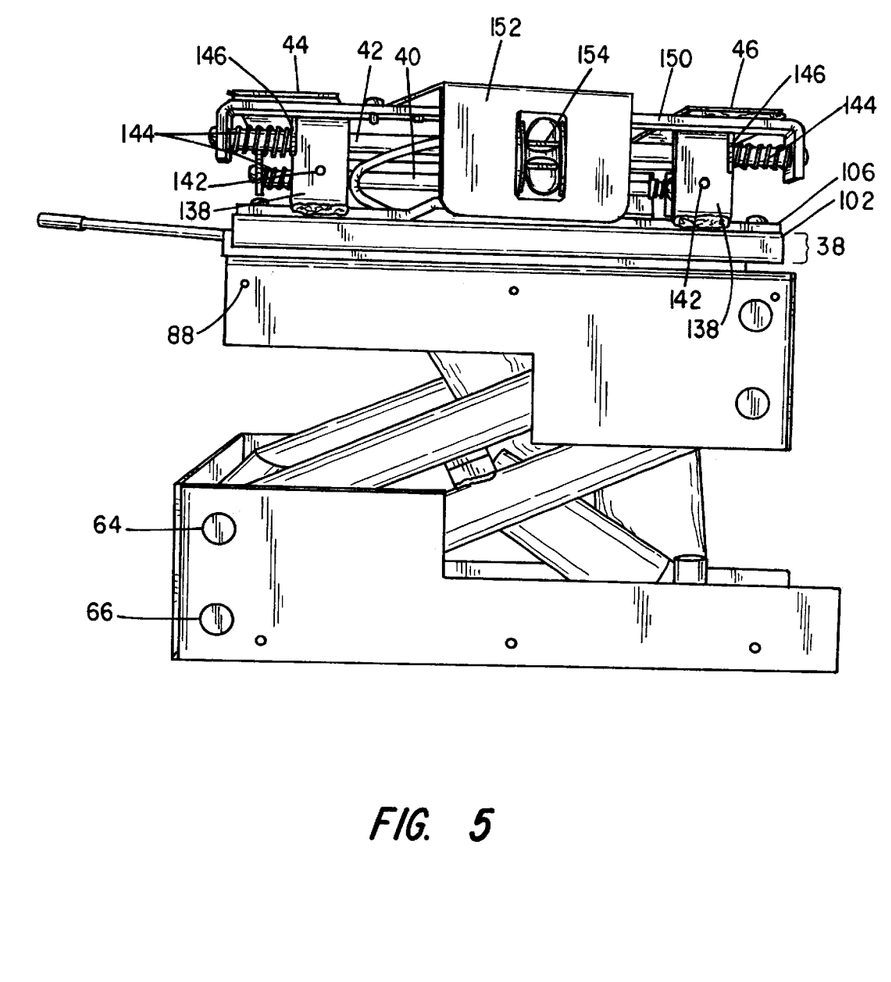
FIG. 5 is a left side perspective view of the seat assembly.
Figure 6:
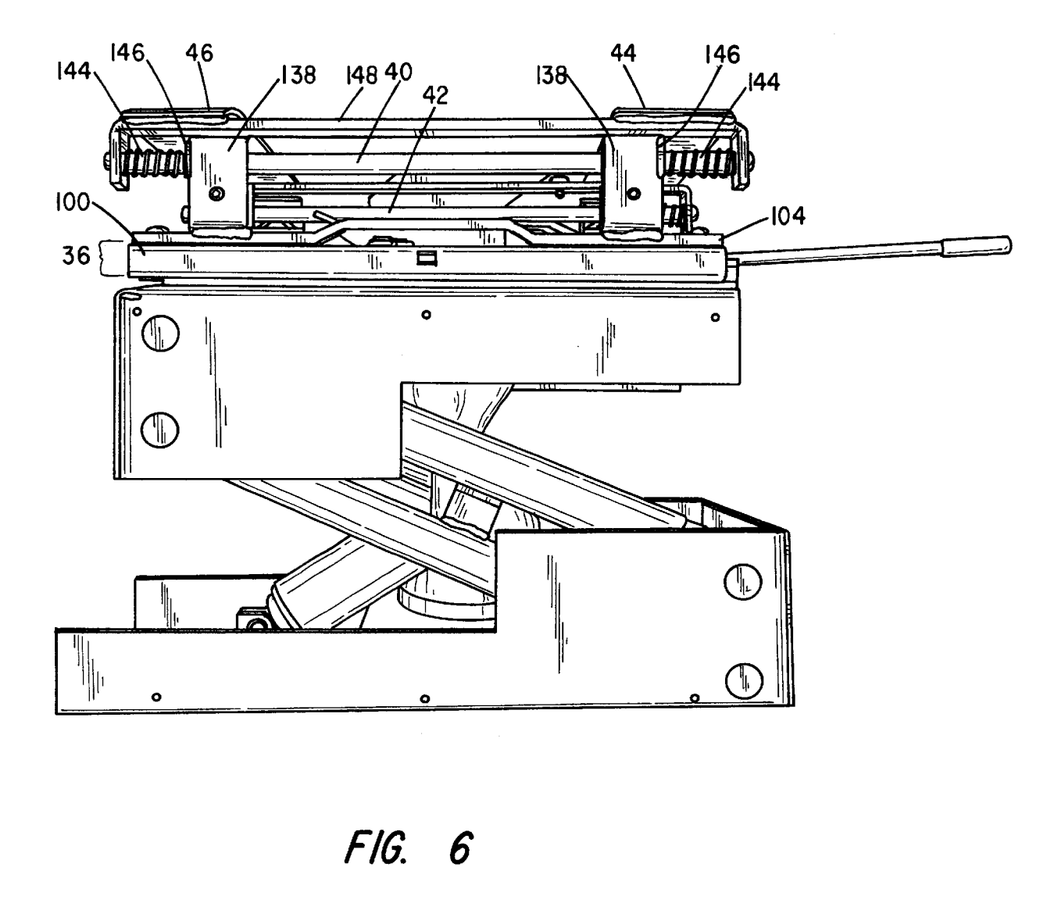
FIG. 6 is a right side perspective view of the seat assembly.

As seen in FIG. 5 and FIG. 6, also forming part of the vehicle seat mount assembly and located above slide rails 36 and 38 are two spacer bars 104 and 106. They are bolted at their ends to the upper C-shaped channels 100 and 102. Spacer bars 104 and 106 are metal bars which are approximately the same width and length as the tops of the C-shaped members they rest upon. The bars flatly engage against members 100 and 102 at their ends, but angle upward slightly in the center forming a raised, flat plateau. Each of four roller support brackets 138 are welded on top of the ends of the spacer bars 104 and 106. The roller support brackets 138 journal grooved metal rollers 140 which serve to guide slide rods 40 and 42 in moving in a horizontal direction. The grooved rollers 140 rotate freely around axels 142 extending through holes in the sides of the roller support brackets 138. The slide rods 40 and 42 move smoothly in the fore and aft direction on the rollers 138, but are limited in travel by shock absorbing coiled springs 144 disposed on each end of the slide rods, pushing against a blocking piece 146 attached to the roller support bracket 138 members. The slide rods are capable of moving a maximum distance which equals the length of the slide rods 40 and 42 that extend outwardly from one of the blocking pieces 146. Capping the ends of the slide rods 40 and 42 are upper bars 148 and 150. These bars run parallel to the slide rods 40 and 42 and are located a distance above the roller supports 138 so as to allow for a small space of clearance. The upper bars 148 and 150 are flat except for their ends which bend 90 degrees downward and cap the ends of slide rods 40 and 42.

On the left side of the assembly, an angled piece of metal is mounted with screws to upper bar 150. This piece of metal is called a "vertical control plate" 152. This plate extends horizontally outward from the side of the remainder of the assembly, then is angled downward. The downward face supports a control means that includes a three position pneumatic control switch 154. This switch contains two hose connections 156 and 158 on its interior side seen in FIG. 4. The upper connection 156 attaches to tube 96, which in turn ends in attachment to angled tube fitting 92 leading into the air spring 30. The second hose connection 158 attaches to a hose (not shown) leading to a source of pressurized air located elsewhere in the vehicle and commonly used to operate the vehicle's air brakes.

The last elements of the vehicle seat mount assembly are the front mount plate 44 and the back mount plate 46. These structures are welded across the front and back of upper bars 148 and 150. Front mount plate 44 contains three bolt holes 160 for mounting, two of these located parallel to one another across its front edge. The back mount plate 46 contains two bolt holes 162 located parallel to one another across its back edge. These mount plates form the base upon which the upholstered vehicle seat is secured. Mounting the seat is accomplished by attaching inserted bolts through the mount plate holes.

Now that the details of the mechanical construction of seat assembly 10 of the present invention have been described, consideration will next be given to its mode of operation.

Upon entering the vehicle, if the driver determines that for comfort, the seat and seat back should be repositioned to provide a comfortable distance between the truck's clutch, brake and accelerator, the operator may displace the actuator lever handle 132 relative to the side of the seat and, in doing so, will pivot the latch plate 114 about a pin 116 causing fingers 122 on latch plate 114 to disengage from a pair of notches 112 formed through the wall of the channel member 108 attached to the upper surface of top panel 26. Latch plate 114 is attached to a cable 130 on the opposite side of the pin. This cable is attached to another latch member 118 which is engaged in notches 112 formed in channel member 110. The movement of lever 132 provides a pull on cable 130 which, in turn, pivots latch member 118 and disengages the fingers from the notches 112 in channel member 110. With the fingers disengaged, the seat may be slid forward or rearward to a desired position along the rails 108 and 110. Releasing the lever 132 allows the return springs 126 and 128 to pull the fingers 122 and 124 of the latch plates back into engagement with the serrated openings on the slide members 108 and 110, thus again locking the mating slide channels to one another.

During vehicle travel, forces acting in the fore and aft direction caused by acceleration and braking will be effectively cushioned by the horizontally disposed shock absorbing compression springs 144 as the seat moves with the slide rods 40, 42. The force of the coiled springs 144 normally urge the sliding vehicle seat to a central position balanced between the force of all four coiled springs.

The vertically directed air spring 30, along with hydraulic dampener 54 and the pivotable linkage assembly are used to control the elevation of the seat and to dampen out any vertically directed forces which the vehicle may encounter, thus tending to isolate the occupant of the seat assembly from vertically directed shock and vibration. For example, upon hitting a bump in the road, a tendency exists for the seat and the occupant to first be lifted relative to the truck's floor and then fall due to the weight of the operator. The hydraulic dampener 54 not only maintains the bottom of the seat in a level plane, but it tends to dampen out any tendency for the seat to vibrate or oscillate due to these sudden vertically directed forces impinging on the seat.

One last important feature to note is the method by which the vertical travel of the seat is limited. As the seat is elevated, the space between the parallel bars 72 and 74 decreases. When this occurs, a limit is reached when the stop 80, affixed to the lower bar 74, comes into contact with the upper bar 72. This limits further upward movement of the seat affixed to the top panel 26.

It can be seen, then, that the present invention provides an improved, flexible and efficient apparatus for mounting a seat within a motor vehicle which functions to effectively isolate the occupant from bearing shock and vibration commonly encountered by semi-truck drivers. The result is that there is less fatigue and soreness experienced by the diver and improved highway safety.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A shock and vibration isolation mount for a motor vehicle seat comprising, in combination:

(a) a stationary base member adapted to be affixed to the floor of a motor vehicle;

(b) a movable base member having linkages for pivotally coupling it to the stationary base member;

(c) means disposed between the stationary base member and the movable base member for displacing the movable base member along a path determined by said linkages;

(d) a pair of elongated slide members, each including first and second rollers journaled for rotation on said movable base member about spaced-apart parallel axes that extend transverse to a longitudinal axis of the motor vehicle and a pair of cylindrical rods supported on a periphery of the first and second rollers;

(e) a vehicle seat mount including a pair of side brackets held in parallel, spaced relation by front and rear cross members, said pair of side brackets connected at opposed ends thereof to opposed ends of the pair of cylindrical rods, and with shock absorbing springs disposed about said pair of cylindrical rods proximate the opposed ends and operatively disposed between the opposed ends of the pair of side brackets and the movable base member; and (f) control means for the means for displacing the movable base member for adjusting the displacement of the movable base member relative to the stationary base member.

2. The shock and vibration isolation mount for a motor vehicle seat as in claim 1 where:

(a) said stationary base member is generally rectangular and has a planar bottom, a pair of side walls in parallel, spaced-apart relation extending upward from said bottom;

(b) said movable base member is generally rectangular and has a planar top and a pair of sidewalls in parallel, spaced-apart relation projecting downward from said top; and (c) said linkage comprising first and second pairs of parallel arms having first and second ends, the first ends of the first pair of parallel arms being pivotally mounted to a first of the pair of the side walls of the stationary base member, the first ends of the second pair of parallel arms being pivotally mounted to a second of the pair of side walls of the stationary base member and the second ends of the respective first and second pairs of parallel arms being pivotally mounted to the pair of sidewalls of the movable base member.

3. The shock and vibration isolation mount for a motor vehicle seat as in claim 2 wherein the means for displacing the movable base member is an inflatable air bag.

4. The shock and vibration isolation mount for a motor vehicle seat as in claim 3 wherein the control means is a multi-position pneumatic valve adapted to couple the air bag to a source of pressurized air when the valve is in a first position and to the ambient when the valve is in a second position, the valve being closed when in a third position.

5. The shock and vibration isolation mount for a motor vehicle seat as in claim 2 and further including a hydraulic dampener operatively disposed between the bottom of the stationary base member and one of the first and second pairs of arms.

* * * * *